United States Patent [19]

Pescetto

[11] 4,059,229
[45] Nov. 22, 1977

[54] TRAVELING SPRINKLER GUIDE WHEEL ASSEMBLY

[75] Inventor: James R. Pescetto, Peoria, Ill.

[73] Assignee: L. R. Nelson Corporation, Peoria, Ill.

[21] Appl. No.: 677,853

[22] Filed: Apr. 16, 1976

[51] Int. Cl.² ............................................. B05B 3/00
[52] U.S. Cl. .................................. 239/183; 301/36 A; 301/43
[58] Field of Search ........... 239/183; 301/36 A, 41 R, 301/43, 52, 63 R, 66

[56] References Cited

U.S. PATENT DOCUMENTS

| 1,501,937 | 7/1924 | Benjamin | 301/41 R |
|---|---|---|---|
| 1,521,834 | 1/1925 | Raymond | 301/43 |
| 2,575,828 | 11/1951 | Muench | 239/183 X |
| 2,901,180 | 8/1959 | Warrick et al. | 239/183 X |
| 3,085,751 | 4/1963 | Warrick et al. | 239/183 |
| 3,698,461 | 10/1972 | Markow | 301/41 R |

FOREIGN PATENT DOCUMENTS 146,347  1/1949  Australia .............................. 239/183

Primary Examiner—John J. Love
Attorney, Agent, or Firm—Cushman, Darby & Cushman

[57] ABSTRACT

A traveling sprinkler and guide wheel assembly therefor which minimizes the chances of the sprinkler leaving operative engagement with a hose defining a path of travel for the sprinkler. The sprinkler includes an elongated body with a water distributing assembly, a pair of cleated drive wheels mounted near the rear thereof, and a guide wheel assembly including a split guide wheel mounted for rotation with respect to a horizontal shaft adjacent the front thereof. Each half of the guide wheel includes a number of radially extending portions defined by slots disposed around the circumference thereof having tip portions extending axially outwardly therefrom.

1 Claim, 3 Drawing Figures

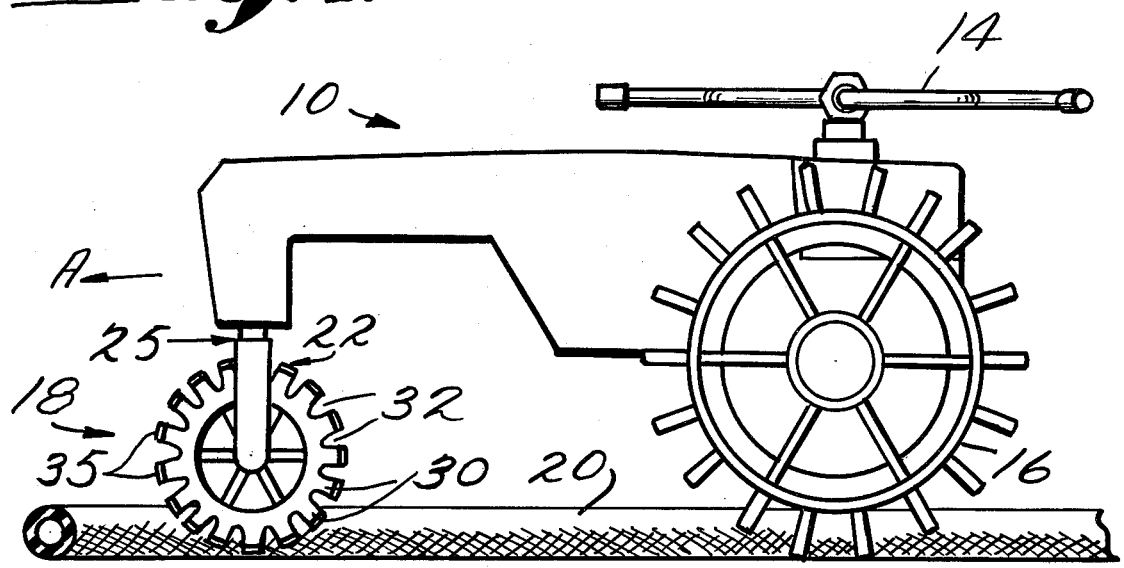
Fig. 1.
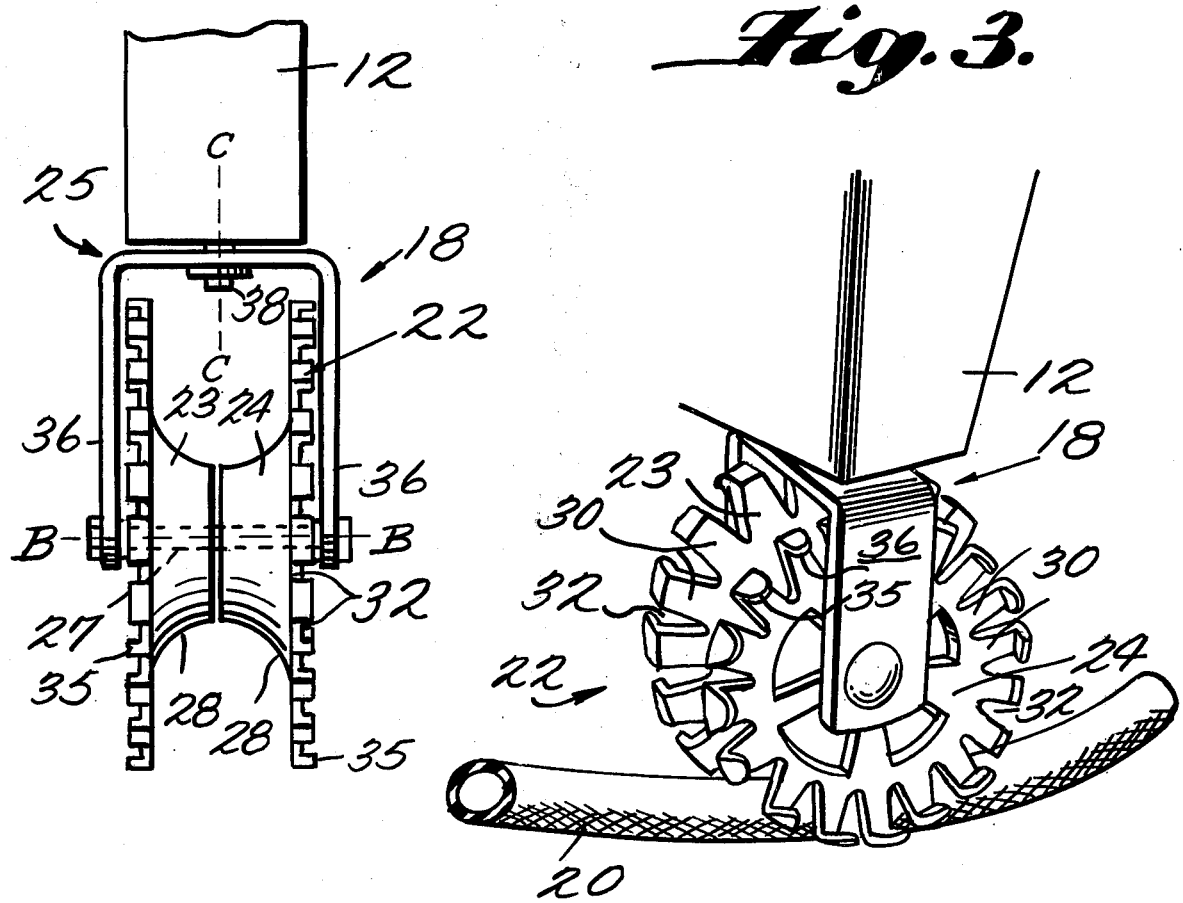
Fig. 3.
Fig. 2.

TRAVELING SPRINKLER GUIDE WHEEL ASSEMBLY

BACKGROUND AND SUMMARY OF THE INVENTION

The invention relates to a traveling sprinkler having an improved guide wheel assembly which minimizes the chances of the sprinkler leaving operative engagement with a hose defining the path of travel for the sprinkler. Many conventional prior art sprinklers have rear drive wheels attached to the sprinkler body, and a guide wheel disposed near the front of the sprinkler body, the guide wheel engaging a hose laid out along a desired path of travel for the sprinkler. Often times there are problems associated with such prior art sprinklers in that the guide wheel has a tendency to go out of engagement with the hose which defines the path it is supposed to follow. If there is a sharp turn in the hose, the guide wheel has a tendency to slide with respect to the hose, and thus climb over the hose or push the hose into an even tighter turn radius so that it is impossible for the sprinkler to negotiate the turn. Also, some prior art wheels ride relatively high in grass through which they are moving which tends to cause them to move out of engagement with the hose, and have too high a resistance to rotation about a vertical axis so that the tendency to slide instead of turn is even greater.

There have been several proposals in the prior art for the provision of split guide wheels to provide assistance in guiding of a sprinkler along a hose path, such as shown in U.S. Pat. Nos. 2,901,180 and 3,085,751, and there have been proposals for providing a common cleated drive and guide wheel, such as shown in U.S. Pat. No. 2,152,425. While such proposals may provide some assistance in maintaining the sprinkler travel in a given path, some of the above-mentioned problems still remain.

According to the present invention, a sprinkler having an improved guide wheel assembly is provided, the guide wheel assembly including a split guide wheel having two wheel halves mounted for rotation about a horizontal shaft and for relative rotation with respect to each other. When the sprinkler having the improved guide wheel assembly according to the present invention enters a curved section of hose, the guide wheel assembly is rotated with respect to the sprinkler about a vertical axis by a force imparted to the inside wheel half. If the torque resisting rotation is great enough, however, the wheel assembly is not rotated about the vertical axis immediately, and all of the weight of the front of the sprinkler is transferred to the inside wheel at the contact point. Since the wheel is split, the inside half rotates in the reverse direction while the outside half rotates in the forward direction, thereby effecting rotation of the wheel assembly about the vertical axis. Also, with the split wheel configuration the torque resisting rotation about the vertical axis is minimized since there are no portions engaging the lawn that tend to develop a resisting torque holding the wheel assembly parallel to the longitudinal axis of the sprinkler body.

The improved guide wheel according to the present invention also is radially slotted, slots extending radially from the periphery of the guide wheel toward the center thereof. The provision of the radial slots defines radially extending portions which ride lower in the lawn, and thus it is more difficult for the wheel to climb over the hose than for a solid wheel. Additionally, the slotted wheel has improved traction over a solid wheel, minimizing the tendency for the wheel to slide and push the hose into too tight a radius, and in combination with the fact that it is split again minimizing the chances that it will climb the hose. Also, tip portions are provided on the radial portions of the guide wheel for causing a downward resistance force to be imparted thereto if the guide wheel starts to slide in making a turn guided by the hose. When the wheel is negotiating a turn the engagement with the lawn grass by the upper surface of the axially extending tip portions on the outside wheel half improves the traction of the guide wheel assembly and tends to offset the lifting force imparted to the inside wheel half by the hose.

According to the present invention a traveling sprinkler is provided comprising an elongated sprinkler body having a water distributing apparatus connected thereto, a pair of cleated drive wheels mounted on either side of the sprinkler body for driving the body, and means for guiding the movement of the sprinkler body in a given direction in dependence upon the position of the hose or the like engaged by the guiding means. The guiding means includes a split freely idling guide wheel having two halves mounted for rotation about a horizontal axis and for rotation with respect to each other, and means for mounting the guide wheel horizontal axis for rotation with respect to the body about a vertical axis. The guide wheel is radially slotted, to improve the traction thereof, and to make it ride lower in the lawn grass relative to the hose. The horizontal axis of the guide wheel is defined by a shaft, and the means for mounting the guide wheel horizontal axis for rotation about a vertical axis with respect to the body includes a forked bracket having portions thereof engaging opposed ends of the shaft, and having an upwardly extending shaft portion thereof received by the body for relative rotation with respect thereto. Preferably, the guide wheel halves are cast of aluminum.

It is the primary object of the present invention to provide an improved guide wheel assembly with a traveling sprinkler. This and other objects of the invention will become clear from an inspection of the detailed description of the invention and from the appended claims.

BRIEF DESCRIPTION OF THE DRAWING

FIG. 1 is a side view of an exemplary traveling sprinkler according to the present invention;

FIG. 2 is a front view of an exemplary wheel assembly according to the present invention; and FIG. 3 is a perspective view of the wheel assembly of FIG. 2 in engagement with a hose while making a turn guided by the hose.

DETAILED DESCRIPTION OF THE INVENTION

An exemplary traveling sprinkler according to the present invention is shown generally at 10 in FIG. 1. The sprinkler 10 comprises an elongated sprinkler body 12, having a water distributing apparatus 14 connected thereto, and a pair of cleated drive wheels 16 mounted on either side of the sprinkler body 12 adjacent the rear thereof for driving the body in direction A, and a guide wheel assembly 18 providing means for guiding the movement of the sprinkler body 12 in direction A in dependence upon the position of the hose 20 or the like engaged by the guide wheel assembly 18. The guide wheel assembly 18 comprises a split guide wheel 22, having halves 23, 24 thereof mounted for rotation about a horizontal axis B—B and for rotation with respect to each other and means 25 for mounting the horizontal axis B—B of the guide wheel 22 for rotation with respect to the body 12 about a vertical axis C—C.

Each of the guide wheel halves 23, 24, is preferably cast of aluminum, and mounted for rotation about a shaft 27 which defines the horizontal axis B—B. Each guide wheel half 23, 24 has hub means 28 formed on the interior portion thereof for engaging a hose 20 or the like for guiding the movement of the sprinkler body 12. The split guide wheel 22 has numerous advantages over a solid guide wheel in improving tracking performance of the guide wheel assembly 18 since the guide wheel halves 23, 24 can rotate with respect to each other. Any torque resisting rotation of the guide wheel assembly 18 about the vertical axis C—C that is caused by the engagement of the guide wheel with the ground is minimized with the split wheel assembly 22 as opposed to a solid wheel, and as the sprinkler enters a curved section of hose 20 all the weight of the front of the body 12 is transferred to the inside wheel half (23 in FIG. 3), the inside wheel half rotates in the reverse direction while the outside wheel half (24 in FIG. 3) rotates in the forward direction, thereby effecting rotation about the vertical axis C—C until the wheel 22 is again tangent to the hose 20.

In order to improve the traction of the wheel 22, and in order to make it ride lower in the lawn relative to hose 20 than a solid wheel, thereby making it more difficult for the wheel to climb over the hose 20, radially extending portions 30 of each of the wheel halves 23, 24 are defined by a plurality of radially extending slots 32 therein. Each of the radially extending slots 32 extends from the periphery of each wheel half 23, 24, toward the center thereof and has formed on the radially outward end thereof a tip portion 35. Each tip portion 35 extends axially outwardly beyond the plane of the associated radial portion 30 as clearly shown in FIG. 2. During traveling of the sprinkler 10 in a straight line, the tip portions 35 of the portions 30 will not engage beneath the lawn grass. However, when a turn is being negotiated, the tip portions 35 disposed on the outer wheel half (24 in FIG. 3) come into operative engagement underneath the lawn grass to provide increased traction and an upwardly facing surface area on which a downward force vector can act. The force vector established on the tip portions 35 causes the outer wheel half (24 in FIG. 3) to be pulled down into the grass, which improves traction and tends to offset the lifting force imparted to the inside wheel (23 in FIG. 3) by the hose 20.

The means 25 for mounting the guide wheel horizontal axis B—B for rotation with respect to the body 12 about vertical axis C—C preferably comprises a forked bracket, having portions 36 thereof engaging opposed ends of shaft 27 and having an upwardly extending shaft portion 38 thereof received by the body 12 for relative rotation with respect thereto.

An exemplary operation of the sprinkler 10 according to the present invention is as follows: The body portion 12 or sprinkler 10 is connected up to the hose 20 so that water is delivered to the water distributing apparatus 14 mounted on the body 12, and the hose 20 is laid along the ground in the path it is desired to have the sprinkler 10 follow. The drive wheels 16 of the sprinkler 10 widely straddle the hose 20, while the guide wheel 20 is so disposed that hose engaging portions 28 of wheel halves 23, 24 engage the hose 20. The cleated drive wheels 16 drive the sprinkler in direction A, as the guide wheel 22 straddles the hose 20 and guides the body 12 along the path defined by the hose 20. When a curve or bend is reached in hose 20 the engagement of the hose 20 with a hose engaging portion 28 of the inside wheel half of the guide wheel 22 causes rotation of the horizontal axis B—B of the guide wheel 22 about the vertical axis C—C. Since the guide wheel 22 is slotted the torque resisting rotation about axis C—C is minimized, and the wheel halves 23, 24 can rotate in opposite directions to insure that the wheel 22 remains tangent to the hose 20. Since the wheel 22 is radially slotted (slots 32) it rides lower in the grass, and the traction thereof is significantly improved over a solid wheel so that the tendency of the guide wheel 22 to climb over the hose 20 is reduced. If the wheel 22 starts to slide in a turn, the axially outwardly tip portions 35 of the outer wheel half 24 cause a downward force to be imparted to the wheel 22, which causes the outer wheel half to be pulled down into the grass, improving the traction, and thereby tending to offset the lifting force imparted to the inside wheel half by the hose 20.

It will thus be seen that according to the present invention a traveling sprinkler with guide wheel assembly therefor has been provided with greatly improved tracking performance. There is a reduced tendency of the sprinkler, according to the invention, to deviate from its desired path of travel since situations when it will climb a hose guiding the sprinkler along its desired path of travel are minimized. While the invention has been herein shown and described in what is presently conceived to be the most practical and preferred embodiment thereof, it will be apparent to those of ordinary skill in the art that many modifications thereof may be made within the scope of the invention, which scope is to be accorded the broadest interpretation of the appended claims so as to encompass all equivalent structures and devices.

What is claimed is:

1. A traveling lawn sprinkler comprising a sprinkler body having a water distributing apparatus thereon adapted to be connected with an elongated hose for communicating a supply of water under pressure therewith, a pair of transversely spaced drive wheels on said sprinkler body for driving said sprinkler body along a lawn to be sprinkled on which the hose is deployed to define a path of driving movement, a bracket carried by said sprinkler in a transverse position between said drive wheels for pivotal movement about an upright axis, a horizontally extending shaft carried by said bracket and a pair of symmetrically-shaped wheel halves carried by said shaft for independent rotational movement with respect to one another about the horizontal axis of said shaft and having complementary exterior peripheries shaped to straddle the hose deployed in the lawn to be sprinkled and to follow the path defined thereby so as to cause the sprinkler body to be guided for driving movement along said path, the improvement which comprises:

each of said pair of wheel halves comprising an annular hub portion adapted to move over a corresponding half of the hose and a marginal periphery having a plurality of annularly spaced slots therein defining a plurality of circumferentially spaced radially extending portions adapted to roll in contact with the lawn to be sprinkled alongside the corresponding half of the hose, each of said radially extending portions having a tip portion extending axially outwardly therefrom beyond the plane defined by the associated radially extending portion in a direction away from the corresponding hose half so that when the latter constitutes the outer half of a curve in the hose the tip portions will engage beneath the lawn grass and resist upward movement occasioned by the engagement of the other inner wheel half with the curved inside half of the hose.

* * * * *